(12) United States Patent
Park

(10) Patent No.: US 12,228,430 B1
(45) Date of Patent: Feb. 18, 2025

(54) VARIABLE RELUCTANCE RESOLVER

(71) Applicant: ZFENCODER, INC., Irvine, CA (US)

(72) Inventor: Chun Soo Park, Irvine, CA (US)

(73) Assignee: ZFENCODER, INC., Irvine, CA (US)

( * ) Notice: Subject to any disclaimer, the term of this patent is extended or adjusted under 35 U.S.C. 154(b) by 0 days.

(21) Appl. No.: 18/915,936

(22) Filed: Oct. 15, 2024

(51) Int. Cl.
G01D 5/20 (2006.01)

(52) U.S. Cl.
CPC .................... G01D 5/2046 (2013.01)

(58) Field of Classification Search
CPC ...... G01D 5/20; G01D 5/2006; G01D 5/2013; G01D 5/202; G01D 5/204; G01D 5/2046; G01D 5/2053; G01D 5/22; G01D 5/2208; G01D 5/2216; G01D 5/2225; G01D 5/2241; G01D 5/225; G01D 5/2258; G01D 5/2275; G01D 5/2291
USPC ............ 324/207.11, 207.12, 207.13, 207.15, 324/207.16, 207.25
See application file for complete search history.

(56) References Cited

U.S. PATENT DOCUMENTS

| | | | |
|---|---|---|---|
| 6,020,737 A | 2/2000 | Wyss | |
| 6,958,602 B2 | 10/2005 | Matsuura et al. | |
| 9,500,500 B2 * | 11/2016 | Ookawara | G01D 5/2046 |
| 11,143,525 B1 | 10/2021 | Park | |
| 11,221,237 B2 | 1/2022 | Park | |
| 2009/0179632 A1 * | 7/2009 | Nishiguchi | G01D 5/2046 |
| | | | 324/207.25 |

FOREIGN PATENT DOCUMENTS

| | | |
|---|---|---|
| EP | 1473548 B1 | 11/2012 |
| JP | H10288537 A * | 10/1998 |
| JP | 2017083191 A * | 5/2017 |

OTHER PUBLICATIONS

Kenichi; Translation of JP2017083191A; May 18, 2017; Translated by Clarivate (Year: 2017).*
Shinichi; Translation of JP H10288537A; Oct. 27, 1998; Translated by Clarivate (Year: 1998).*
X. Ge, et al., "A Novel Variable Reluctance Resolver with Nonoverlapping Tooth-Coil Windings", IEEE Trans. Energy Conversion, vol. 30, No. 2, Jun. 2015.
Chris K. Park et al., "Multiphase Sensor Signal Processing", IEEE Sensors Letters, vol. 6, No. 2, Jun. 2022.

* cited by examiner

*Primary Examiner* — Eman A Alkafawi
*Assistant Examiner* — Rahul Maini
(74) *Attorney, Agent, or Firm* — LRK PATENT LAW FIRM

(57) ABSTRACT

Variable reluctance (VR) resolvers applicable to even or odd speed are provided. In an N-phase VR resolver, 2N coil-poles are evenly distributed around the stator, N being odd integer greater than or equal to three. Primary coils are wound with the same number of turns, but their winding polarities alternate across the coil-poles. The number of turns and winding polarities for sine and cosine signal sensing coils are determined by sine and cosine synthesis coefficients of N-phase zero-force transform. The coil turns ratios between sine and cosine signal sensing coils relative to the primary coil are dictated by absolute values of the coefficients, while the winding polarities are determined by signs of the coefficients. In odd-speed VR resolvers, winding polarities of pair of sensing coils symmetrically located 180 degrees apart must be identical, whereas in even-speed VR resolvers, these winding polarities must be opposite.

3 Claims, 5 Drawing Sheets

VARIABLE RELUCTANCE RESOLVER

BACKGROUND OF THE INVENTION

1. Field of the Invention

The claimed subject matter relates to a resolver apparatus, and more particularly, to a novel variable reluctance (VR) resolver apparatus, to obtain the precise rotated angle of circularly moving objects.

2. Description of Related Art

In many position-sensing applications, the position detection of a target sensing element is typically based on two-phase orthogonal signals, sine and cosine, that are sensed by sensors. The rotated angle ($\theta$) of the target sensing element is calculated by taking the arctangent between the sensed sine and cosine signals.

VR resolvers, together with wound-rotor (WR) resolvers, have been widely used in motion control industries due to their robust position-sensing capabilities in harsh environments. Resolvers are composed of a stator and a rotor, which typically produce the sensed sine and cosine signals. VR resolvers have a simple architecture, as all coils are wound only on the stator, while WR resolvers have a more complex architecture, with coils wound on both the stator and the rotor, resulting in superior performance.

VR resolvers are more economical and robust in harsh environments than WR resolvers; however, the theoretical framework underpinning their design principles has yet been fully established. Achieving a 1× speed VR resolver—where one full mechanical rotation of the rotor generates a single cycle of electrical signals due to the rotor having a single lobe—has been challenging without a unified theoretical design principle. Most VR resolvers used in the industry are even-numbered in speed and rely on ad-hoc or heuristic design approaches, resulting in sub-optimal performance; hence, they are primarily used in low-resolution applications.

The design of accurate 1× speed VR resolvers has generally required increased complexity. U.S. Pat. No. 6,958,602B2 discloses a method that employs two rotors—one with two lobes (2× speed) and the other with three lobes (3× speed)—on the same rotating axis, from which 1× speed signals are generated.

In EP1,473,548B1, a 4× speed rotor is redundantly employed alongside a 1× speed rotor to compensate for the inaccuracies of the 1× speed VR resolver.

U.S. Pat. No. 6,020,737 discloses an interacting VR resolver that features a ring of soft magnetic material interposed between the north and south magnetic pole structures on the rotor. An adjustable compensation coil structure within the stator housing interacts with the rotor's flux pattern to obtain more precise angular readings.

X. Ge, et al. ("A Novel Variable Reluctance Resolver with Nonoverlapping Tooth-Coil Windings," IEEE Trans. Energy Conversion, vol. 30, no. 2, June 2015) present a 1× VR resolver with improved coil-windings. While the paper attempts to enhance the coil-winding configuration, the position-sensing accuracy remains limited, with an error of approximately ±0.6 degrees.

In U.S. Pat. No. 11,221,237B2 by the present inventor, it is disclosed that sequentially phase-delayed displacement signals from Hall sensors over one electrical period can be represented by a system of linear equations with two unknown variables: the two-phase orthogonal signals of sine and cosine. These two-phase orthogonal signals can be mathematically calculated by solving the system of linear equations, a method referred to as a "zero-force (ZF) transform." The ZF transform is fundamentally a linear transversal filtering that utilizes filter coefficients, referred to as "synthesis coefficients." These synthesis coefficients comprise sine synthesis coefficients and cosine synthesis coefficients, which are used to synthesize the sine and cosine signals, respectively. The theory of multi-phase sensed signal processing and its application to Hall sensors is published in "Multiphase Sensor Signal Processing," IEEE Sens. Lett., vol. 6, no. 2, June 2022, Art. No. 2500504, by the present inventor.

As an application of multi-phase signal processing to VR resolvers, a multi-phase VR resolver architecture is disclosed in U.S. Pat. No. 11,143,525B1. The multi-phase resolver can be functionally and physically divided into two parts: a multi-phase resolver body and a multi-phase signal processing circuitry, which performs the ZF transform function. The topology of the multi-phase VR resolver body facilitates the straightforward realization of a 1× VR resolver.

Building on specific topologies of the multi-phase VR resolver body disclosed in U.S. Pat. No. 11,143,525B1, the present invention reveals that the multi-phase signal processing circuitry can be integrated into the coil-windings of the multi-phase VR resolver body. By eliminating the need for the ZF transform function, a 1× VR resolver is achieved without increasing complexity.

The concept of integrating the ZF transform function into the multi-phase VR resolver body leads to a generalized design principle for a novel VR resolver that supports any speed, whether even-numbered or odd-numbered. The output signals of this new type of resolver are compatible with those of conventional VR resolvers. This novel resolver is thus named a "ZF VR resolver," reflecting the method of coil-winding on the coil-poles following the ZF transform.

SUMMARY OF THE INVENTION

The present invention has been made in view of the aforementioned background, and discloses a novel VR resolver designed for any even-numbered or odd-numbered speed.

In one general aspect, the invention provides an N-phase VR resolver apparatus including a stator and a rotor, where N is an odd integer greater than or equal to three. The stator includes N coil-poles positioned at equal intervals around the inside of the stator body, referred to as odd coil-poles. Additional N coil-poles are positioned inside the stator body, paired with the N odd coil-poles. Each of these additional N coil-poles is symmetrically located at 180 degrees relative to its corresponding odd coil-pole and is referred to as an even coil-pole.

At each of the N odd and N even coil-poles, three types of coils are wound: a primary coil, a sine signal sensing coil, and a cosine signal sensing coil. All the primary coils are wound with the same number of turns, but their winding polarities alternate between the odd and even coil-poles.

The number of turns and winding polarities for the sine and cosine signal sensing coils are determined by sine synthesis coefficients and cosine synthesis coefficients of a N-phase ZF transform, respectively. Specifically, the coil turns ratios of the sine signal sensing and cosine signal sensing coils relative to the primary coil at a pair of odd and even coil-poles at position n ($1 \leq n \leq N$) are determined by the absolute values of the corresponding sine synthesis and cosine synthesis coefficients at position n (1≤n≤N) of the N-phase ZF transform, respectively. The winding polarities of the sine signal sensing and cosine signal sensing coils at a pair of odd and even coil-poles at position n (1≤n≤N) are determined by the signs of corresponding sine synthesis and cosine synthesis coefficients at position n (1≤n≤N) of the N-phase ZF transform, respectively.

The rotor comprises a lobe that defines a specific electrical period on the stator for each mechanical turn of the rotor.

An odd-numbered speed N-phase VR resolver may be configured. The resolver includes a stator where the coil-winding polarities of the sine signal sensing coils (or the cosine signal sensing coils) on a pair of odd and even coil-poles are identical. The rotor comprises a lobe that defines an odd-numbered electrical period on the stator for each mechanical turn of the rotor.

An even-numbered speed N-phase VR resolver may be configured. The resolver includes a stator where the coil-winding polarities of the sine signal sensing coils (or the cosine signal sensing coils) on a pair of odd and even coil-poles are opposite. The rotor comprises a lobe that defines an even-numbered electrical period on the stator for each mechanical turn of the rotor.

One or more of the above-disclosed embodiments in addition to certain alternatives are provided in further detail below with reference to the attached figures. The claimed subject matter is not, however, limited to any particular embodiment disclosed.

BRIEF DESCRIPTION OF THE DRAWINGS

Embodiments of the claimed subject matter are understood by referring to the figures in the attached drawings, as provided below.

Features, elements, and aspects that are referenced by the same numerals in different figures represent the same, equivalent, or similar features, elements, or aspects, in accordance with one or more embodiments.

DETAILED DESCRIPTION OF THE INVENTION

In the following, numerous specific details are set forth to provide a thorough description of various embodiments of the claimed subject matter. Certain embodiments may be practiced without these specific details or with some variations in detail. In some instances, certain features are described in less detail so as not to obscure other aspects of the disclosed embodiments. The level of detail associated with each of the elements or features should not be construed to qualify the novelty or importance of one feature over the others.

Most commercially used VR resolvers feature multiple excitation coils along with multiple sine and cosine sensing coils. These resolvers generate the two-phase orthogonal signals that are amplitude modulated (AM) by an excitation carrier signal. Generally, multiple even-numbered coil-poles with varying numbers of coil turns and polarities are configured in the VR resolvers to maintain magnetic flux balance.

Figure 1:
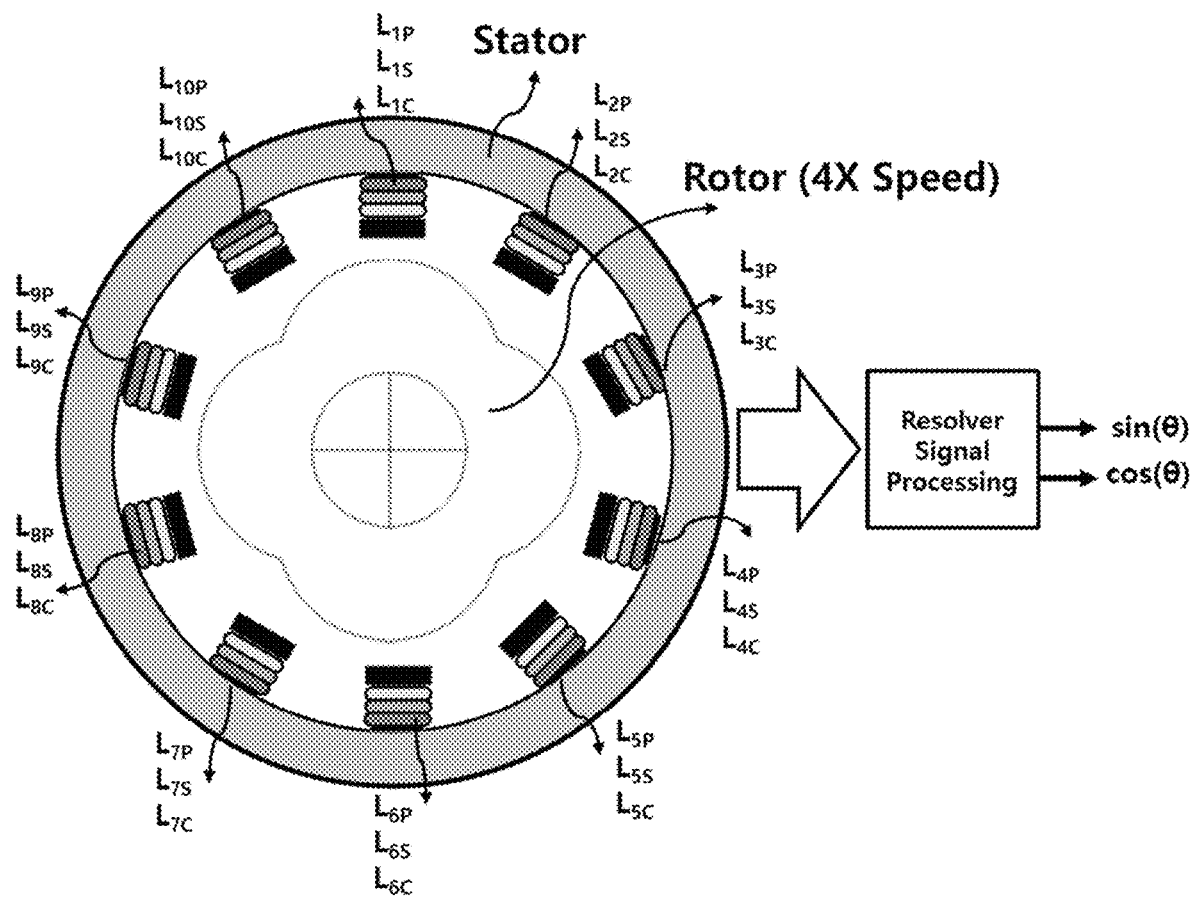
FIG. 1 shows a block diagram of a conventional 10 coil-pole VR resolver, wherein a 4× speed rotor with four lobes is installed.

FIG. 1 shows a block diagram of a conventional 10-coil-pole VR resolver typically used in motion control industries. In this resolver, three types of coils—excitation coil (primary coil), sine signal sensing coil, and cosine signal sensing coil—are wound overlappingly on each coil-pole. The number of coil turns varies from coil-pole to coil-pole, depends on the type of signal and has a varying winding polarity. The carrier AM sine and cosine signals sensed directly by the sensing coils on the 10 coil-poles are further processed by a resolver signal processor to produce carrier-removed two-phase orthogonal signals.

Figure 2:
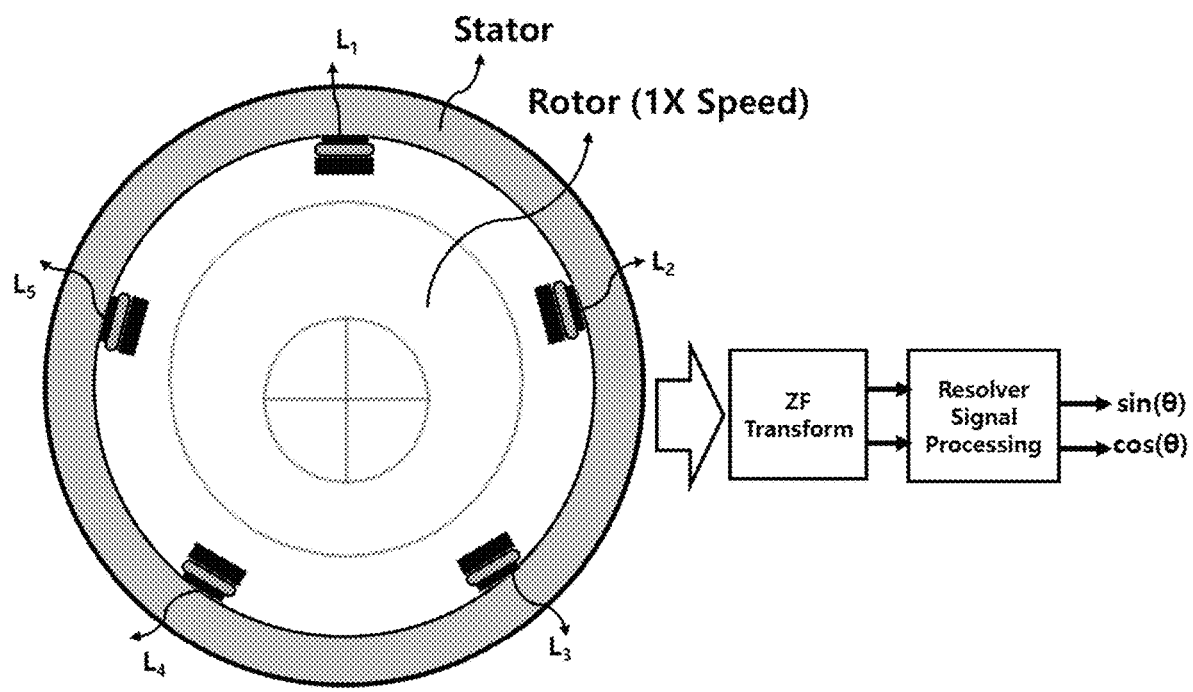
FIG. 2 shows a block diagram of a conventional single coil-wound 5-phase VR resolver, wherein a 1× speed rotor with a single lobe is installed.

In FIG. 2, as an example of a multi-phase VR resolver, a block diagram of a 5-phase VR resolver is illustrated according to U.S. Pat. No. 11,143,525B1, where a single coil is wound on each coil-pole for both excitation and sensing, and all coils have the same number of turns with identical winding polarity. In this design, five carrier AM and sequentially phase-delayed sinusoidal displacement signals are sensed from the coils on five coil-poles as the rotor rotates. This type of multi-phase VR resolver is called a "single-coil wound multi-phase VR resolver." The simple topology of the single-coil wound multi-phase VR resolver body facilitates the realization of a 1× VR resolver.

In the single-coil wound VR resolver, amplitude under-modulation by the excitation carrier signal is allowed. In the sensed sinusoidal signals on coils ($L_1$, $L_2$, $L_3$, $L_4$, $L_5$), unmodulated carrier signal components may be present. However, these components are removed in the subsequent multi-phase signal processing circuitry (ZF transform function) by differential signal processing.

Referring to FIG. 9B in U.S. Pat. No. 11,143,525B1, an architecture of a balance-wired 5-phase VR resolver body is depicted, where each coil-pole in the single-coil wound 5-phase VR resolver body is subdivided into two coil-poles: odd and even coil-poles. Physically, subdivided odd and even coil-poles are positioned symmetrically with 180° mechanical angle offsets and are connected serially. The balance-wired multi-phase VR resolver has the same electrical characteristic as the single-coil wound version, however, it offers superior performance due to improved flux balances.

Additionally, FIG. 9D in the U.S. Pat. No. 11,143,525B1 discloses a double-wound coil-winding schematic diagram. In this configuration, each coil (excitation and sensing) in the single-coil wound multi-phase VR resolver is separated into an excitation (primary) coil and a secondary sensing coil. This arrangement achieves galvanic isolation by completely isolating the electrical paths of the primary coils from those of the secondary coils. The flux balance is maintained independently within all primary coils and all secondary sensing coils.

Figure 3:
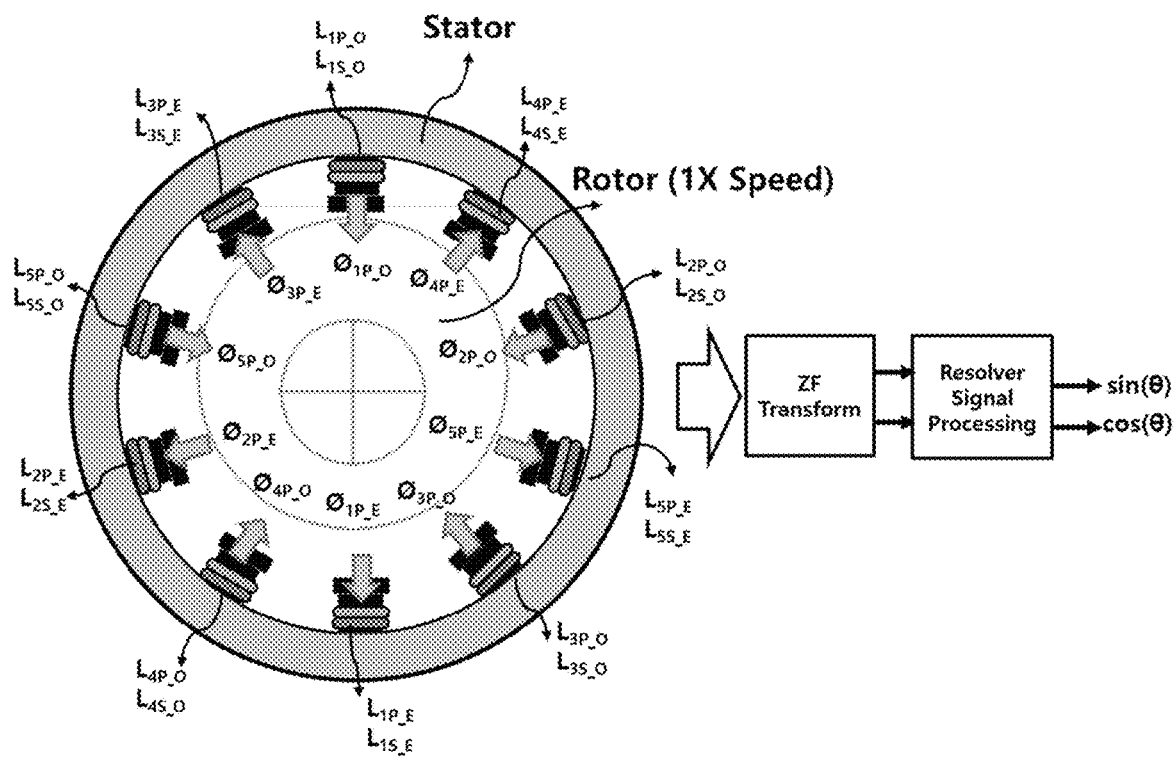
FIG. 3 shows a block diagram of a conventional balance-wired and double-wound 5-phase VR resolver, wherein a 1× speed rotor with a single lobe is installed.

The single-coil wound 5-phase VR resolver body shown in FIG. 2 is configured to its balanced-wired and double-wound version as illustrated in FIG. 3. The five coil-poles in FIG. 2 are increased to 10 coil-poles due to the balanced wiring, as each coil-pole has a corresponding opposite coil-pole. The five coil-poles ($L_1$, $L_2$, $L_3$, $L_4$, $L_5$) are subdivided into odd and even coil-poles with a 180° mechanical angle offset. The coil-poles originally shown in FIG. 2 are labeled odd coil-poles ($L_{1\_O}$, $L_{2\_O}$, $L_{3\_O}$, $L_{4\_O}$, $L_{5\_O}$) and the coil-poles positioned opposite them are labeled even coil-poles ($L_{1\_E}$, $L_{2\_E}$, $L_{3\_E}$, $L_{4\_E}$, $L_{5\_E}$).

Additionally, because they are double-wound, each coil-pole features both a primary coil and a secondary sensing coil wound around it. The primary coils and secondary coils are labeled with the subscripts "P" and "S," respectively.

In FIG. 3, the primary coils at symmetrically located coil-poles are wired in opposite polarities. For example, the primary coil ($L_{1P\_O}$) at coil-pole #1_O is wired in the clockwise (CW) direction, while the primary coil ($L_{1P\_E}$) at coil-pole #1_E is wired in the counterclockwise (CCW) direction, or vice versa. When all the primary coils are wound with the same number of turns and their polarities are opposite between the odd and even coil-poles, the flux directions of the coils on the odd coil-poles are opposite to those on the even coil-poles. In FIG. 3, the flux direction of each coil is indicated by an arrow. For instance, the flux direction ($\emptyset_{1P\_O}$) induced on the $L_{1P\_O}$ coil is opposite to that ($\emptyset_{1P\_E}$) induced on the $L_{1P\_E}$ coil.

Figure 4:
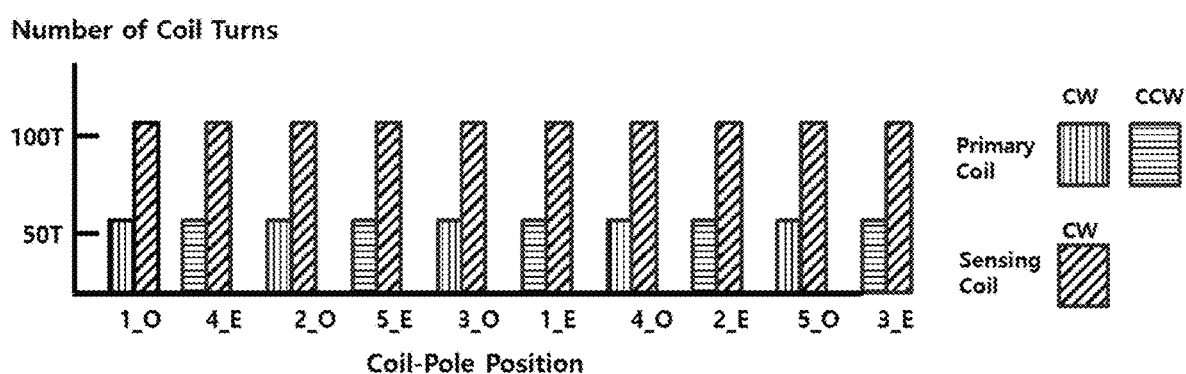
FIG. 4 graphically illustrates the number of coil turns and winding polarities of the primary and secondary sensing coils at each coil-pole for the conventional balanced-wired and double-wound 5-phase VR resolver.

Next to the primary coil, a sensing coil ($L_S$) is wound on each of the coil-poles. All sensing coils are wound with the same number of turns at an identical polarity. The number of coil turns and winding polarity for each primary and sensing coil at each coil-pole are graphically drawn in FIG. 4.

When a carrier signal with angular frequency ω is applied to the primary coils and the rotor is positioned at angle θ, the induced signal voltages $V_{1S\_O}$ and $V_{1S\_E}$ on the sensing coils $L_{1S\_O}$ and $L_{1S\_E}$ can be expressed as follows, respectively:

$$V_{1S\_O} = K_{1S\_O} * \left(\frac{N_S}{N_P}\right) * (1 + m_{1S\_O} * \sin(\theta)) * \sin(\omega t) \quad \text{EQ. (1)}$$

$$V_{1S\_E} = K_{1S\_E} * \left(\frac{N_S}{N_P}\right) * (-1 + m_{1S\_E} * \sin(\theta) * \sin(\omega t)) \quad \text{EQ. (2)}$$

In the above equations, $K_{1S\_O}$ and $K_{1S\_E}$ are transfer functions determined by the magnetic circuit on $L_{1S\_O}$ and $L_{1S\_E}$, respectively. $N_E$ and $N_S$ represent the number of coil turns for the primary and secondary sensing coils, respectively. Displacement modulation indices $m_{1S\_O}$ and $m_{1S\_E}$ are determined by the airgap of the rotor lobe. The carrier phases of the induced signals $V_{1S\_O}$ and $V_{1S\_E}$ are 180° out of phase.

Let $K_{1S\_O}=K_{1S\_E}=K_{1S}$, then the sum $V_{1S}$ of $V_{1S\_O}$ and $V_{1S\_E}$ becomes, $$V_{1S} = V_{1S\_O} + V_{1S\_E} = 2 * K_{1S} * \left(\frac{N_S}{N_P}\right) * m_{1S} * \sin(\theta) * \sin(\omega t) \quad \text{EQ. (3)}$$

In EQ. (3), $m_{1S}=m_{1S\_O}+m_{1S\_E}$ is applied, which implies $m_{1S}$ is the sum of displacement modulation indices at positions $L_{1S\_O}$ and $L_{1S\_E}$ on a contour of the single rotor lobe. The summed induced signal $V_{1S}$ in EQ. (3) has no unmodulated carrier signal components because the flux directions between the odd and even primary coils are opposite. The sensed sinusoidal signals induced at mechanically 180° symmetrical coil-poles are each modulated by a carrier with opposite polarity. The symmetrically arranged carrier is then canceled out.

The above explanation regarding $V_{1S}$ equally applies to the sinusoidal displacement signals $V_{2S}$, $V_{3S}$, $V_{4S}$, and $V_{5S}$, sensed on the respective pairs of coils, ($L_{2S\_O}$, $L_{2S\_E}$), ($L_{3S\_O}$, $L_{3S\_E}$), ($L_{4S\_O}$, $L_{4S\_E}$), and ($L_{5S\_O}$, $L_{5S\_E}$), respectively.

As shown in FIG. 3, the sensed displacement signals ($V_{1S}$, $V_{2S}$, $V_{3S}$, $V_{4S}$, $V_{5S}$) are ZF transformed and processed by the resolver signal processor to produce the two-phase orthogonal signals of sin(O) and cos(O). As mentioned earlier, the ZF transform is linear combination of the sensed sinusoidal signals, utilizing synthesis coefficients as linear combination coefficients.

Let the sine signal synthesis and cosine signal synthesis coefficients be ($a_1$, $a_2$, $a_3$, $a_4$, $a_5$) and ($b_1$, $b_2$, $b_3$, $b_4$, $b_5$), respectively, then voltages $V_{sin(\theta)}$ and $V_{cos(\theta)}$ of the sin(θ) and cos(θ) signals can be written as follows:

$$V_{sin(\theta)}=(a_1*V_{1S})+(a_2*V_{2S})+(a_3*V_{3S})+(a_4*V_{4S})+(a_5*V_{5S})$$

$$V_{cos(\theta)}=(b_1*V_{1S})+(b_2*V_{2S})+(b_3*V_{3S})+(b_4*V_{4S})+(b_5*V_{5S}) \quad \text{EQ. (6)}$$

The resultant synthesis coefficients for the 5-phase configuration are detailed in the U.S. Pat. No. 11,143,525B1 as follows:

$$(a_1,a_2,a_3,a_4,a_5)=(0.4,0.1236,-0.3236,-0.3236,0.1236)$$

$$(b_1,b_2,b_3,b_4,b_5)=(0.0,-0.3804,-0.2352,0.2352,0.3804) \quad \text{EQ. (7)}$$

When EQ. (6) is substituted with the actual coefficients in EQ. (7), it becomes, $$V_{sin(\theta)}=0.4*V_{1S}+0.1236*V_{2S}-0.3236*V_{3S}-0.3236*V_{4S}+0.1236*V_{5S}$$

$$V_{cos(\theta)}=0.0*V_{1S}-0.3804*V_{2S}-0.2352*V_{3S}+0.2352*V_{4S}+0.3804*V_{5S} \quad \text{EQ. (8)}$$

The rotational angle (θ) of the rotor is calculated by taking the arc tangent of the ratio between $V_{sin(\theta)}$ and $V_{cos(\theta)}$ in EQ. (8) after the resolver signal processing.

In summary, in the balance-wired and double-wound multi-phase VR resolver, the secondary sensing coils have the same number of winding turns, and the sensed carrier AM sinusoidal signals have no unmodulated carrier signal components due to the opposite coil-winding polarities of the primary coils at the odd and even coil-pole positions. However, the ZF transform circuitry remains necessary to convert the sensed sinusoidal signals into the two-phase orthogonal signals.

Ongoing research has demonstrated that the ZF transform function can be integrated into the coil-windings of the balance-wired and double-wound VR resolver body by adding a cosine signal sensing coil at each coil-pole. In other words, the coil-winding configuration—encompassing the number of turns and winding polarities—can be designed to incorporate the ZF transform function, thus eliminating the need for separate multi-phase signal processing circuitry.

This new type of resolver is referred to as the "ZF VR resolver" as the number of coil-winding turns and the winding polarities of the sine and cosine signal sensing coils are determined by the sine synthesis coefficients and cosine synthesis coefficients of the ZF transform, respectively. To explain the design principle of the ZF VR resolver, it is necessary to separately address the odd-numbered speed and even-numbered speed configurations. The following discussion details the design principle of the ZF VR resolver specifically for the 5-phase configuration, where the coil-windings on the coil-poles are determined by EQ. (8).

The Odd-Numbered Speed ZF VR Resolver

Figure 5:
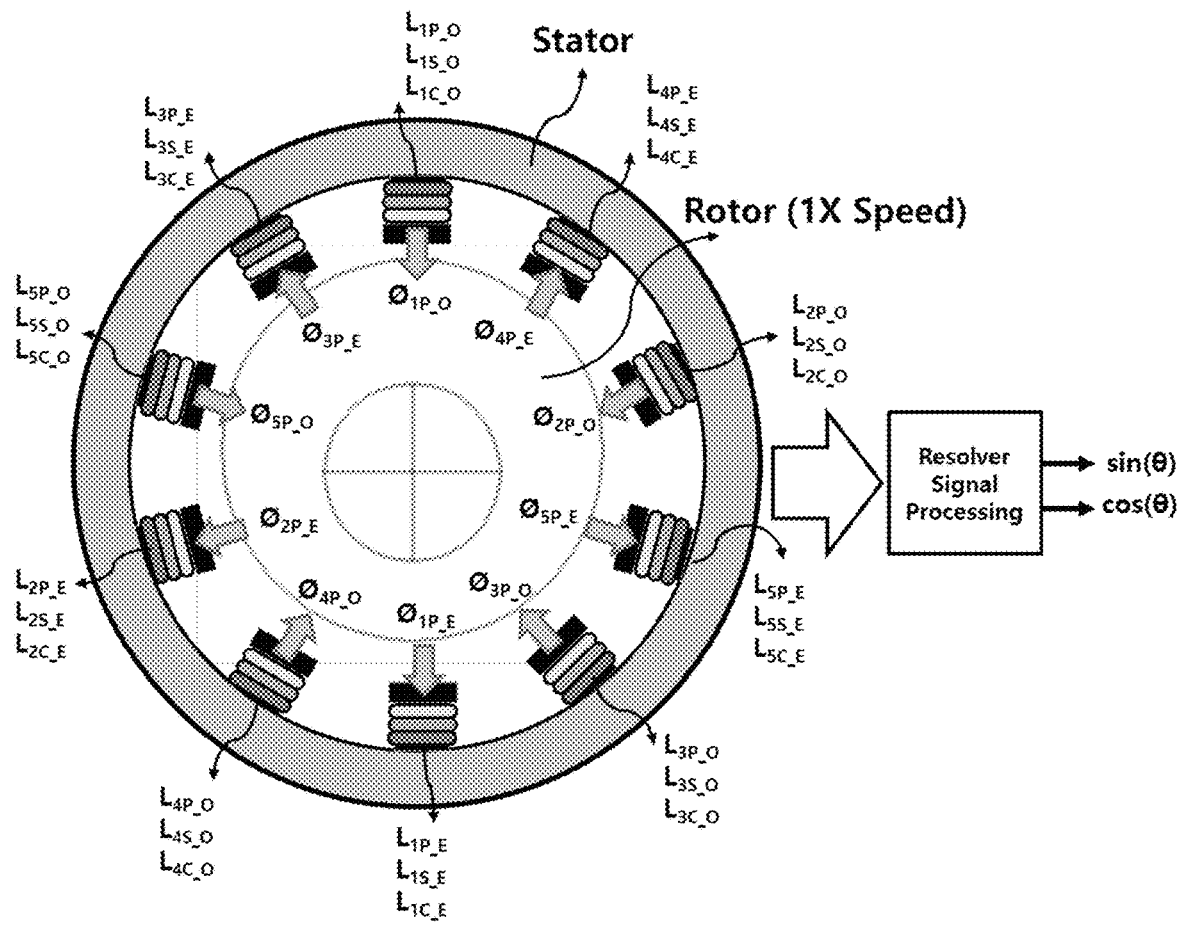
FIG. 5 illustrates a 1× speed 5-phase ZF VR resolver according to the present invention, wherein a 1× speed rotor with a single lobe is installed.

When an additional cosine signal sensing coil is added to each coil-pole of the balance-wired and double-wound 5-phase VR resolver, three types of coils are wound at each coil-pole: the primary coil, the sine signal sensing coil, and the cosine signal sensing coil, as illustrated in FIG. 5. This figure also shows the 1× speed rotor with a single lobe.

A closer examination of FIG. 5 and EQ. (8) reveals that the coefficient at each coil-pole position in EQ. (8) represents a weight applied to the signal sensed at that position. A positive (+) sign in the coefficient indicates addition, while a negative (−) sign indicates subtraction.

Thus, absolute values of the coefficients can be replaced by the number of coil turns on the corresponding coil-poles, with positive (+) and negative (−) signs indicating the winding polarities. The windings of the sine signal sensing and cosine signal sensing coils follow the sine synthesis and cosine synthesis coefficients, respectively. That is, the magnitude of each coefficient in EQ. (8) determines the coil turn ratio of the sine (or cosine) sensing coil to the primary coil, while the sign of the coefficient determines the winding polarity of the sine (or cosine) signal sensing coil at the corresponding coil-pole position.

Let the numbers of coil-winding turns for the sine signal sensing coils be $N_{1S}$, $N_{2S}$, $N_{3S}$, $N_{4S}$, $N_{5S}$ for the pair of coils $(L_{1S\_O}, L_{1S\_E})$, $(L_{2S\_O}, L_{2S\_E})$, $(L_{3S\_O}, L_{3S\_E})$, $(L_{4S\_O}, L_{4S\_E})$, $(L_{5S\_O}, L_{5S\_E})$, respectively. The coil turns ratios of the sine signal sensing coils to the primary coil are: $(N_{1S}/N_P, N_{2S}/N_P, N_{3S}/N_P, N_{4S}/N_P, N_{5S}/N_P)$=(0.4, 0.1236, 0.3236, 0.3236, 0.1236). When the sign of the sine synthesis coefficient is positive or negative, the coil-winding polarity is clock-wise (CW) or counter clock-wise (CCW). Therefore, the coils $(L_{1S\_O}, L_{1S\_E})$, $(L_{2S\_O}, L_{2S\_E})$, and $(L_{5S\_O}, L_{5S\_E})$ are wired in the CW direction, while the coils $(L_{3S\_O}, L_{3S\_E})$ and $(L_{4S\_O}, L_{4S\_E})$ are wired in the CCW direction.

Likewise, let the number of coil-winding turns for the cosine signal sensing coils be $N_{1C}$, $N_{2C}$, $N_{3C}$, $N_{4C}$, $N_{5C}$ for the pair of coils $(L_{1C\_O}, L_{1C\_E})$, $(L_{2C\_O}, L_{2C\_E})$, $(L_{3C\_O}, L_{3C\_E})$, $(L_{4C\_O}, L_{4C\_E})$, $(L_{5C\_O}, L_{5C\_E})$, respectively. The coil turns ratios of the cosine signal sensing coils to the primary coil are: $(N_{1C}/N_P, N_{2C}/N_P, N_{3C}/N_P, N_{4C}/N_P, N_{5C}/N_P)$=(0.0, 0.3804, 0.2352, 0.2352, 0.3804). The coils $(L_{4C\_O}, L_{4C\_E})$ and $(L_{5C\_O}, L_{5C\_E})$ are wired in the CW direction, while $(L_{2C\_O}, L_{2C\_E})$ and $(L_{3C\_O}, L_{3C\_E})$ are wired in the CCW direction.

Figure 6:
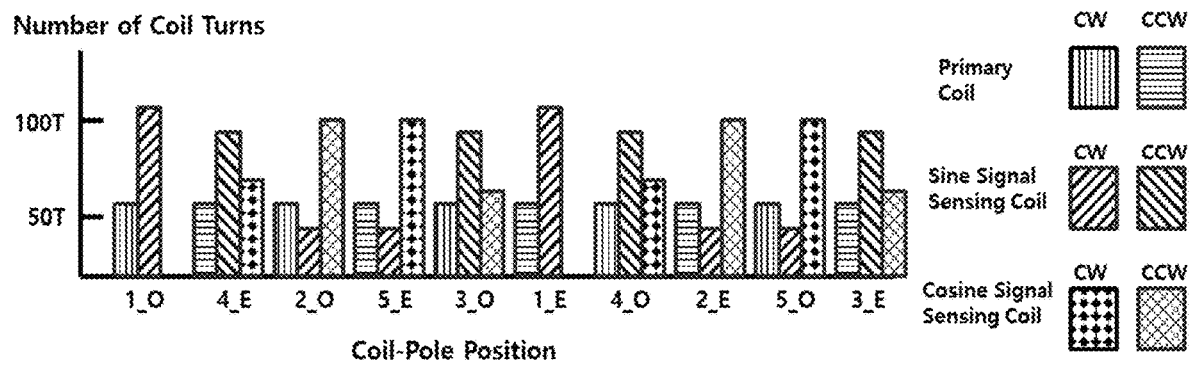
FIG. 6 graphically illustrates the number of coil turns and winding polarities of the primary, sine signal sensing, and cosine signal sensing coils at each coil-pole for the 1× speed 5-phase ZF VR resolver according to the present invention.

The explanation for the 1× speed rotor applies similarly to any odd-numbered speed rotors. FIG. 6 illustrates the coil-windings of the 5-phase ZF VR resolver for odd-numbered speed rotors. The diagram shows the number of coil turns and the winding polarity of the primary, sine signal sensing, and cosine signal sensing coils at each coil-pole. The same number of coil turns is wound for all the primary coils, but with alternating winding polarities over the coil-poles. The sine signal and cosine signal sensing coils are wound with the same polarities between the odd and even coil-poles of each paired coil-pole, with their coil turn ratios relative to the primary coil determined by the absolute values of the corresponding synthesis coefficients.

In summary, the explanation discloses that the odd-numbered speed VR resolvers, including those with 1× speed, can be realized using the balance-wired and double-wound N-phase VR resolver body. The coil-winding turns and polarities for such resolvers are determined by the synthesis coefficients of the N-phase ZF transform, where N is an odd integer greater than or equal to three.

The Even-Numbered Speed ZF VR Resolver

Figure 7:
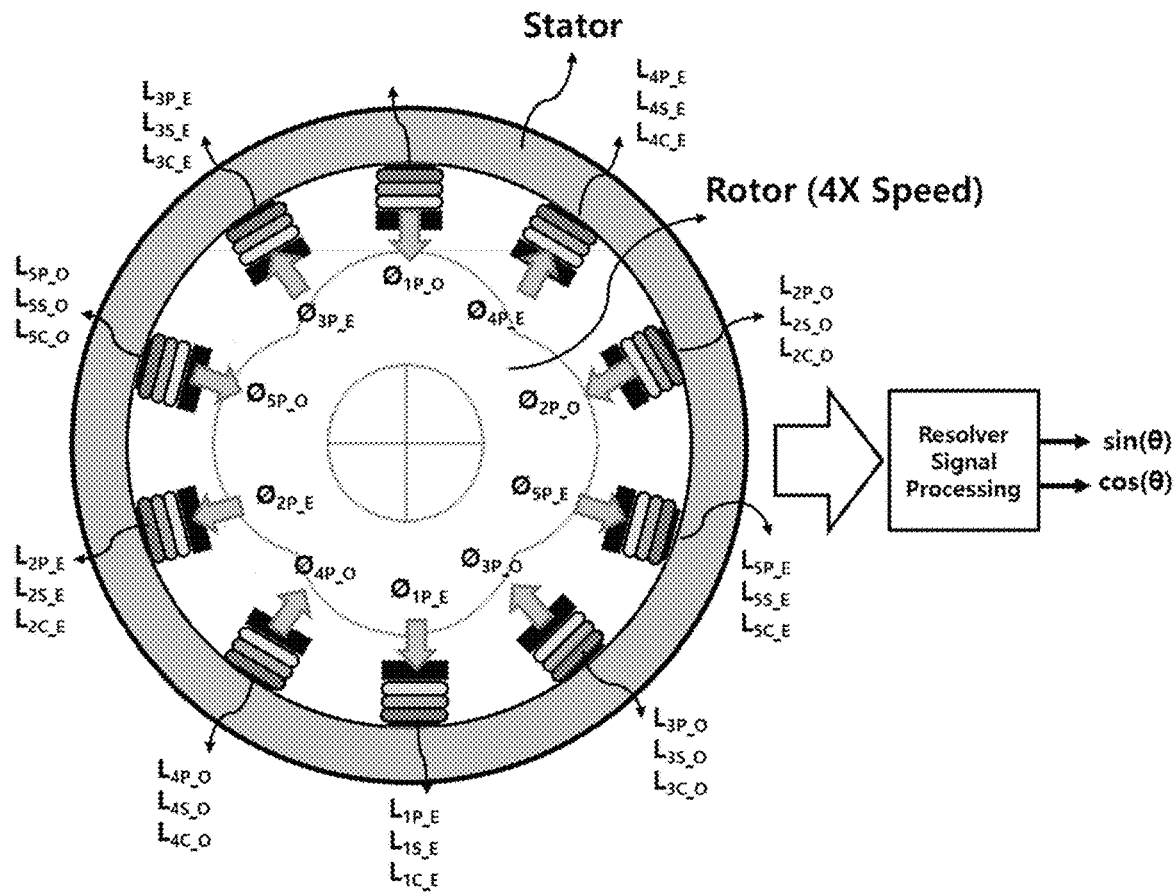
FIG. 7 illustrates a 4× speed 5-phase ZF VR resolver according to the present invention, wherein a 4× speed rotor with four lobes is installed.

For the case of an even-numbered speed ZF VR resolver, consider a 5-phase ZF VR resolver with a 4× speed rotor, as shown in FIG. 7. The 4× speed rotor produces four electrical periods per one mechanical turn of the rotor since the rotor has four lobes.

As previously mentioned, the primary coils at symmetrically located coil-poles are wired in opposite polarities. In contrast to odd-numbered speed rotors, a pair of coils at symmetrically located coil-poles senses the same rotational angle of the rotor due to the even-numbered lobes of the rotor.

In other words, a pair of sine signal sensing coils (or cosine signal sensing coils) located at coil-pole #1_O and #1_E should have the same carrier phase since these two signals represent equivalent displacement signals. To ensure they are in phase, the sine signal and cosine signal sensing coils at symmetrically located coil-poles should be 180° out of phase with each other as the carrier phases are 180° out of phase due to the opposite polarity of the primary coils at the symmetrically located coil-pole positions. The resultant carrier phases of the sensed signals at the symmetrically located coil-pole positions are in phase. To achieve this, the coil-winding polarities should be opposite between sine signal sensing or cosine signal sensing coils at the symmetrically located coil-poles.

Figure 8:
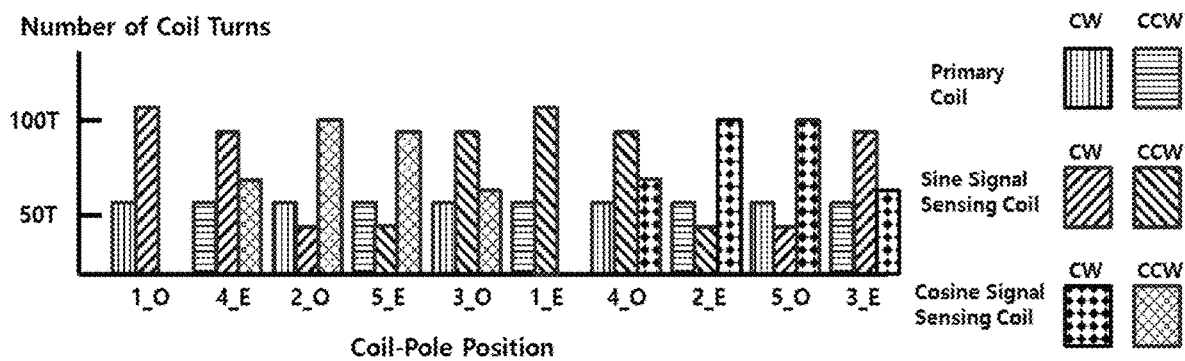
FIG. 8 graphically illustrates the number of coil turns and winding polarities of the primary, sine signal sensing, and cosine signal sensing coils at each coil-pole for the 4× speed 5-phase ZF VR resolver according to the present invention.

FIG. 8 shows the coil-windings of the 5-phase ZF VR resolver with even-numbered speed rotors. The diagram shows the number of coil turns and the winding polarity of the primary, sine signal sensing, and cosine signal sensing coils at each coil-pole. The same number of coil turns is wound for all the primary coils with alternating winding polarities over the coil-poles. The coil turn ratios of the sine and cosine sensing coils to the primary coil are determined by the absolute values of the corresponding synthesis coefficients. The sine signal sensing and cosine signal sensing coils are wound with opposite polarities between the odd and even coil-poles of each paired coil-pole.

In summary, the explanation discloses that even-numbered speed VR resolvers are implemented using a balance-wired and double-wound N-phase VR resolver body. In this design, the coil-winding turns and polarities are determined by the synthesis coefficients of the N-phase ZF transform, where N is an odd integer greater than or equal to three.

The claimed subject matter has been described above with reference to one or more features or embodiments. Those skilled in the art will recognize, however, that changes and modifications may be made to these embodiments without departing from the scope of the claimed subject matter. These and various other adaptations and combinations of the embodiments disclosed are within the scope of the claimed subject matter as defined by the claims and their full scope of equivalents.

What is claimed is:

1. An N-phase variable reluctance resolver apparatus, N being an odd integer greater than or equal to three, the N-phase variable reluctance resolver apparatus comprising:
 a stator comprising:

N number of coil-poles that are positioned at equal intervals around the inside of the stator and are referred to as odd coil-poles;

additional N number of coil-poles that are positioned paired with the N odd coil-poles, wherein each of the additional N coil-poles is located symmetrically at 180 degrees relative to its corresponding each of the N odd coil-poles, wherein the additional N number of coil-poles are referred to as even coil-poles; and three types of coils including a primary coil, a sine signal sensing coil, and a cosine signal sensing coil, which are wound at each of the N odd and N even coil-poles, wherein all primary coils are wired with the same number of coil turns, but with alternating winding polarities between the odd and even coil-poles, wherein the number of turns and winding polarities for the sine signal and cosine signal sensing coils are determined by sine synthesis and cosine synthesis coefficients of a N-phase zero-force (ZF) transform, respectively, wherein coil turns ratios of the sine signal sensing and cosine signal sensing coils relative to the primary coil on a pair of odd and even coil-poles at position n ($1 \leq n \leq N$) are determined by absolute values of the corresponding sine synthesis and cosine synthesis coefficients at position n ($1 \leq n \leq N$) of the N-phase ZF transform, respectively, wherein coil-winding polarities of the sine signal and the cosine signal sensing coils on a pair of odd and even coil-poles at position n ($1 \leq n \leq N$) are determined by signs of the corresponding sine synthesis and cosine synthesis coefficients at position n ($1 \leq n \leq N$) of the N-phase ZF transform, respectively, a rotor comprising:
a lobe defining at least one electrical period on the stator over one mechanical turn of the rotor.

2. The N-phase variable reluctance resolver apparatus of claim 1, wherein an odd-numbered speed N-phase variable reluctance resolver is configured, the odd-numbered speed N-phase variable reluctance resolver comprising:

a stator comprising:
the sine signal sensing and cosine signal sensing coils that are wound with identical polarities between the odd and even coil-poles of each paired coil-pole; and a rotor comprising:
a lobe defining an odd-numbered electrical period on the stator over one mechanical turn of the rotor.

3. The N-phase variable reluctance resolver apparatus of claim 1, wherein an even-numbered speed N-phase variable reluctance resolver is configured, the even-numbered speed N-phase variable reluctance resolver comprising:

a stator comprising:
the sine signal sensing and cosine signal sensing coils that are wound with opposite polarities between the odd and even coil-poles of each paired coil-pole; and a rotor comprising:
a lobe defining an even-numbered electrical period on the stator over one mechanical turn of the rotor.

* * * * *